Jan. 18, 1955   H. A. ANDERSON ET AL   2,699,656
GEAR TYPE COUPLING DEVICE
Filed Jan. 7, 1953
FIG. 1
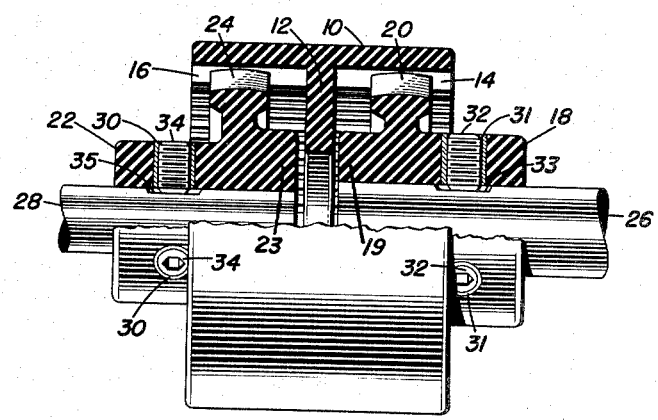
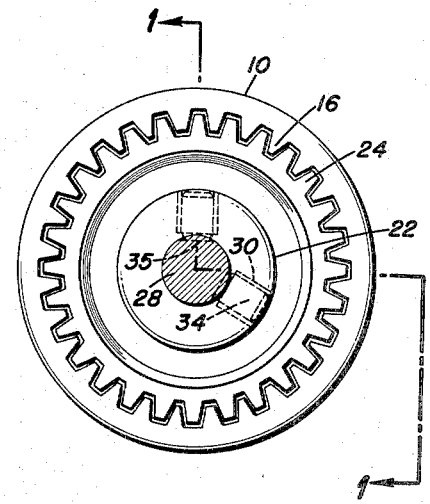
FIG. 2.
INVENTOR
Henry A. Anderson
Robert Eadie
Harry L. Morley
BY Leech & Radue
ATTORNEYS

United States Patent Office 2,699,656
Patented Jan. 18, 1955

2,699,656
GEAR TYPE COUPLING DEVICE

Henry A. Anderson, Plainfield, Robert Eadie, Rahway, and Harry L. Morley, Highland Park, N. J., assignors to John Waldron Corporation, New Brunswick, N. J., a corporation of New Jersey Application January 7, 1953, Serial No. 330,098

2 Claims. (Cl. 64—9)

The present invention relates to a gear type coupling device. It is more particularly directed to a non-metallic coupling device for interconnection of shafts of relatively small size and load requirements.

It is the principal object of this invention to provide a small gear type coupling device of molded plastic construction having a minimum of parts, ease of assembly, and a relatively low cost.

A further object is to provide a coupling device of the character indicated that will be quiet in operation, require no lubrication, have relatively flexible intermeshing teeth, high resistance to chemicals and corrosive conditions, and be of a relatively light weight for minimizing of dynamic forces of rotation.

An additional and specific object of this invention resides in the provision of a gear type coupling device comprising essentially a cylindrical shell having a central inner flange with internal teeth extending from its ends to said flange, and a hub portion with external teeth on the midportion thereof disposed in meshing relation within each of the two cylindrical shell portions separated by said flange.

A further and important object of the invention is to provide a non-metallic gear type coupling device of the character described that is of molded nylon composition in order to avoid the costs of cutting and broaching the teeth of the interfitting parts.

Although a coupling device made entirely of molded nylon requires no lubrication and is generally satisfactory, the relatively high friction coefficient of interengaged nylon surfaces may be substantially reduced by molding either the shell or the hub portions with teeth of "Teflon," which has a relatively low coefficient of friction in such a working combination. It is preferred to use "Teflon" for the smaller hub portions because of its greater cost.

These and other beneficial features and advantages will be more fully understood from the following detailed description of a preferred embodiment of the invention, when taken in connection with the accompanying drawing, in which:

Fig. 1 is a side elevation of the coupling device of this invention partially sectioned longitudinally on line 1—1 of Fig. 2 to show the assembled working relation of parts and the manner of shaft connection; and Fig. 2 is a left end view of the device of Fig. 1 drawn to reduced scale.

The coupling device as illustrated comprises a molded cylindrical shell 10 having a central inner flange 12, and sets of internal teeth 14 and 16 extending from the right and left ends respectively of shell 10 to the adjacent face of said flange. This entire component is molded nylon FM-10001.

Nylon FM-10001 is a standard article of commerce supplied by the Dupont Company and described in "Nylon Molding Powder" information Bulletins No. X-39 and X-40 of 1952 as being stiff, having high-temperature resistance, and with an extrusion temperature of 550°-625° F. and a molding temperature range of 500°-700° F.

A large hub member 18 in the form of a shaft collar extends outwardly of the right end of the shell 10 and has an inner end portion 19 with a set of external teeth 20 extending outwardly from an integral gear ring portion and disposed intermediate the length of said hub.

A similar hub member or shaft collar 22 projects outwardly of the left end of the cylindrical shell 10 and is smaller than the hub member 18 except for an inner enlarged portion 23 adjacent the flange means 12. A set of external teeth 24 extend outwardly from an integral gear ring portion into engagement with the internal teeth 16 of the shell 10.

It will be observed that the faces of the hub end portions 19 and 23 are adapted alternatively to abut the respectively adjacent faces of the central inner flange 12 of the shell 10, said hub end faces being spaced by shaft or similar mounting to provide an adequate working clearance on each side of the flange.

Both the external teeth 20 and 24 have a spherical longitudinal profile, the radius center of which is on the longitudinal axis of the respective hub members 18 and 22.

The internal teeth 14 and 16 of the cylindrical shell 10, and the external teeth 20 and 24 of the hub members 18 and 22 extend completely around the respective peripheries and intermesh loosely in each other as shown in Fig. 2. This figure also indicates the transversely flat end or stub tooth profiles of teeth 14, 16, 20 and 24.

A relatively large shaft 26 may be connected to the hub member 18 by insertion into the central bore thereof as shown in Fig. 1. The connection of a small shaft 26 to the hub member 22 is similarly made by insertion into the bore of the latter. A pair of tapped lock inserts 31 are made in the outer end portion of the hub member 18 to receive set screws 32, 32 in flush relation upon engagement with shaft indentations 33, the set screws and indentations being spaced 120°. Smaller tapped lock inserts 30 extend through the outer end portion of the small hub member 22 and receive smaller set screws 34, 34, which engage indentations 35 on the shaft 28 at points spaced 120°.

All the functions of a coupling device of this type are obtained by the use of only three components, i. e. the cylindrical shell 10, the toothed hub member 20 and the toothed hub member 24, because the central inner flange 12 of the shell 10 is limited to longitudinal movement in the range defined by the adjacent faces of the inner ends of the hub members when the latter are secured to their respective shafts as shown. In this operative assembled relation the toothed hub members 18 and 22 are free for limited rotation about transverse axes to provide a universal joint action accommodating misalignment of the large shaft 26 and small shaft 28.

Thus it will be understood that the internal teeth 14 and 16 may be readily formed to final shape by molding without necessity for slow machine broaching, and the hub members 18 and 22 with their spherical tooth ends on integral gear rings may also be formed in the most economical manner possible through simple molding of thermosetting plastic material.

The construction disclosed requires no snap ring retainers or seals such as are conventionally used. The unlubricated tooth faces will not be harmed by abrasive materials, because such materials entering in between the teeth will embed themselves in the nylon composition without material damage. Nevertheless, to minimize the entry of such foreign matter and to provide adequate support for the aligning action of the spherical teeth 20 and 24, such teeth are fully received within the opposite ends of the cylindrical shell 10.

Coupling teeth made of nylon are quite flexible and tough, this molded nylon having a maximum toughness for a given rigidity. These properties make for quite coupling operation because of uniform loading resulting from the flexible transfer of load from tooth to tooth.

It will be understood that the relatively light weight of the coupling device of this invention keeps the dynamic forces of rotation to a low value that tends to avoid shaft vibration.

The now generic term "nylon" describes a linear condensation product consisting of polymeric amides.

"Teflon" is a tough plastic product composed of polymers of tetrafluoroethylene, having the properties of toughness over a wide temperature range, chemical inertness, heat resistance, solvent resistance, other corrosion resistance, electrical insulation and moldability.

In special installations the good electrical insulation property of nylon and "Teflon" is of considerable importance.

Although an illustrative and preferred embodiment of the coupling device has been described in detail, it is to

Having thus described the invention what is claimed as novel and desired to be secured by Letters Patent of the United States is:

1. A gear type shaft coupling device composed of molded nylon and consisting of a cylindrical shell having a central inner flange and being formed with internal teeth extending from each end of the shell to the flange, and a shaft collar formed with radially projecting spherical teeth on the midportion intermeshing loosely with the internal teeth at each end of the shell, the inner end portion of each shaft collar being adapted to abut the adjacent face of the central flange and thus prevent engagement by the corresponding end surface of the radially projecting teeth, and the internally toothed portions of the shell being of a length completely to receive the radially projecting teeth of each collar member.

2. The combination with a pair of shafts having adjacent ends aligned in spaced relation, of means coupling said shaft ends and comprising essentially a cylindrical shell of molded nylon having a central inner flange and being formed with internal teeth extending from each end of the shell substantially to the flange, said inner flange being adjacent the space between said shaft ends, and a molded nylon hub member formed with radially projecting spherical teeth on the midportion thereof secured on each shaft end and intermeshing loosely with the internal teeth at the corresponding end of the shell, the inner end portion of each hub portion being of a size to abut the adjacent side of the central inner flange of said cylindrical shell, and the said internal teeth extending lengthwise of the shell at each end for a distance sufficient completely to receive the radially projecting teeth of the received hub members, whereby misalignment of the shafts is accommodated by relative movement of the intermeshing shell teeth and hub teeth and the shell is loosely retained in operative relation to the hub members by having the inner flange thereof received between the inner ends of the hub members.

References Cited in the file of this patent

UNITED STATES PATENTS

| | | |
|---|---|---|
| 1,983,007 | Simons | Dec. 4, 1934 |
| 2,035,171 | Loewus | Mar. 24, 1936 |
| 2,421,546 | Dalton | June 3, 1947 |
| 2,541,790 | Sugden et al. | Feb. 13, 1951 |